United States Patent [15] 3,673,281
Bronstert et al. [45] June 27, 1972

[54] CATALYTIC HYDROGENATION OF POLYMERS CONTAINING DOUBLE BONDS

[72] Inventors: Klaus Bronstert, Carlsberg; Volker Ladenberger; Gerhard Fahrbach, both of Schwetzingen, all of Germany

[73] Assignee: Badische Anilin- & Soda-Fabrik Aktiengesellschaft, Ludwigshafen/Rhine, Germany

[22] Filed: Jan. 29, 1971

[21] Appl. No.: 111,137

[30] Foreign Application Priority Data

March 20, 1970 Germany .................P 19 13 263.2

[52] U.S. Cl..........................260/880 B, 260/82.1, 260/83.3, 260/83.5, 260/85.1, 260/94.7 H, 260/96 HY, 260/690, 260/879
[51] Int. Cl. ....................C08d 5/00, C08d 5/02, C08f 27/24
[58] Field of Search..............260/94.7 H, 94.9 H, 96 H, 85.1

[56] References Cited

UNITED STATES PATENTS 3,541,064  11/1970  Yoshimoto et al.....................260/85.1

Primary Examiner—James A. Seidleck
Assistant Examiner—William F. Hamrock
Attorney—Johnston, Root, O'Keeffe, Keil, Thompson & Shurtleff

[57] ABSTRACT

A process for the catalytic hydrogenation of polymers containing double bonds by the action of hydrogen on a solution of the polymer in an inert organic solvent in the presence of a catalyst complex comprising:
  A. a compound of iron, cobalt or nickel,
  B. an organo-aluminum compound, and
  C. a hexa-alkylphosphoric acid triamide of the general formula $OP(NR_2)_3$ in which R stands for alkyl of from one to four carbon atoms, the catalyst components A and B being used in a molar ratio of from 1 : 40 to 1 : 1 and the components A and C in a molar ratio of from 1 : 0.5 to 1 : 100.

2 Claims, No Drawings

CATALYTIC HYDROGENATION OF POLYMERS CONTAINING DOUBLE BONDS

This invention relates to a process for the hydrogenation of polymers containing double bonds in solution and in the presence of a catalyst complex comprising:

A. a compound of iron, cobalt or nickel,
B. an organo-aluminum compound, and
C. hexa-alkylphosphoric acid triamide as activator.

Polymers of diene hydrocarbons contain double bonds in the molecule chain. These double bonds may be hydrogenated by conventional processes. Products which are wholly or partly hydrogenated in this way are superior to non-hydrogenated polymers in that they possess improved resistance to aging and are particularly resistant to oxidative degradation. In the case of block copolymers of dienes and vinyl aromatic compounds, in particular, the hydrogenated products also show improved tensile properties and mechanical strength. When only partially hydrogenated, the diene polymers may be vulcanized. Such vulcanizates possess a higher tensile strength and a lower glass temperature than vulcanizates of non-hydrogenated diene polymers.

The catalytic hydrogenation of diene polymers in solution is known. In a process described in German Published application DAS No. 1,215,372 the hydrogenating catalyst consists of A. an organic compound of a metal of sub-group VIII of the Periodic Table, and
B. a metal hydrocarbon compound.

German Published Patent application DAS No. 1,811,037 discloses a hydrogenation process in which the catalyst consists of A. an organic compound of nickel or cobalt, and
B. a lithium, magnesium or aluminum-alkyl compound.

We have found that the rate of hydrogenation of polymers containing double bonds in inert organic solvents is greatly increased when a catalyst complex consisting of A. a compound of iron, nickel or cobalt, and
B. an organo-aluminum compound is used and there is added thereto
C. a hexa-alkylphosphoric acid triamide as activator.

The activator has the general formula:

$$OP(NR_2)_3$$

where R is alkyl of from one to four carbon atoms. The catalyst components A and B are used in a molar ratio of from 1 : 1 to 1 : 40 and the components A and C are used in a molar ratio of from 1 : 0.5 to 1 : 100.

In a special embodiment of the invention a further amount of hexa-alkylphosphoric acid triamide is added on completion of the hydrogenation of the polymer solution, whereafter the catalyst complex is destroyed by the addition of water (which may be acidified) and the catalyst residues are separated together with the aqueous phase.

The addition of activator C to the hydrogenation mixture effects a considerable increase in the rate of hydrogenation, the duration of hydrogenation being shortened by about 20 times. As compared with other activating additives, such as ethers, amines, or similarly strongly polar solvents, the hydrogenation period is shortened by more than four times. The process of the invention permits hydrogenation to be carried out under considerably milder conditions, that is, at lower temperatures and pressures. It also allows the catalyst concentration to be reduced considerably.

The addition of hexa-alkylphosphoric acid triamides moreover facilitates the removal of the catalyst residues from the polymer solution, this effect being enhanced by a further addition of hexaalkylphosphoric acid triamide on completion of the hydrogenation.

All polymers containing double bonds may be hydrogenated by the process of the invention. The polymers may have molecular weights of from 1,000 to 1,000,000. The process is particularly useful for the hydrogenation of polymers of conjugated dienes, for example homo- or co-polymers of butadiene, isoprene, 2,3-dimethylbutadiene, piperylene etc. Particularly important copolymers in this class are those with vinyl compounds, for example with styrene, substituted styrenes, acrylonitrile, substituted acrylonitriles, and acrylates and methacrylates. The copolymers may be random copolymers, block copolymers or segment copolymers in which one homopolymer block X is attached to one or two homopolymer blocks Y. Graft copolymers, for example those of vinyl aromatic compounds on diene polymers, are also hydrogenatable. The process of the invention is particularly advantageous in the hydrogenation of diene polymers produced by anionic solvent polymerization using organometallic catalysts such as lithiumalkyls.

In a preferred embodiment of the invention the hydrogenation is carried out immediately after polymerization, in situ, in which case it is not necessary for the polymerization catalyst to be destroyed or removed from the reaction mixture. The concentration of polymer in the solution is from 1 to 80 percent, preferably from 15 to 25 percent, by weight. The hydrogenation of polybutadiene oils may, if desired, be carried out in the absence of solvents.

Hydrogenation is carried out in solution in an inert organic solvent. By the term "inert" we mean that the solvent is not reactive with the reagents involved in the hydrogenation. Suitable solvents are, for example, aliphatic hydrocarbons such as hexane or heptane, and ethers such as diethyl ether or tetrahydrofuran. Aromatic hydrocarbons such as benzene, toluene or ethyl benzene may only be used where the hydrogenation conditions are such that the aromatic double bonds are not attacked.

Component A of the catalyst complex consists of a compound of iron, cobalt or nickel. These metals may be present in either their divalent or trivalent forms. The anions may be both inorganic and organic residues, preferred anions being chlorides, bromides, acetates, acetylacetonates and naphthenates. Most of these compounds are soluble in organic solvents, but if this is not the case, fine dispersions may be conveniently used.

Component B consists of an organo-aluminum compound. Preferred compounds are aluminum trialkyls such as aluminum trimethyl, aluminum triethyl or aluminum triisobutyl. However, aluminum alkyl hydrides, aluminum alkyl esters and aluminum alkyl halides are also suitable.

Component C acts as an activator on the catalyst complex A + B. It consists of a hexa-alkylphosphoric acid triamide of the general formula:

$$OP(NR_2)_3$$

where R is alkyl of from one to four carbon atoms. We prefer to use hexamethylphosphoric acid triamide (HMPT).

The components A and B of the catalyst are used in a molar ratio of from 1 : 40 to 1 : 1, and the components A and C are used in a molar ratio of from 1 : 0.5 to 1 : 100. The preferred ratio of A to B is from 1 : 20 to 1 : 2, and the preferred ratio of A to C is from 1 : 1 to 1 : 50. The optimum ratios in any given case are governed by the nature of the components, and they may be determined by simple series of experiments. Where cobalt acetylacetonate is used as component A and aluminum triisobutyl is used as component B the optimum ratio of A to B to C is, for example, about 1 : 9 : 6; where iron acetylacetonate is used as component A, the optimum ratio is 1 : 9 : 4; and where iron chloride is used as component A, the optimum ratio is 1 : 4 : 30.

The addition of the activator C to the catalyst complex makes it possible to use very low catalyst concentrations. Hydrogenation may be carried out at concentrations of less than $10^{-3}$ down to about $10^{-6}$ moles of component A per liter of solution.

The catalyst complex is prepared by mixing together the individual components, conveniently in an inert organic solvent under a blanket of inert gas such as $N_2$, $H_2$ or Ar and at temperatures between $-20°$ and $+120°$ C. The components then react with each other to form the catalyst complex, usually as a deeply colored substance. It is believed that this reaction causes the metal to change to a lower valency form, although it apparently does not separate in the metallic form but is held in solution by complex bonds or remains colloidally dispersed in the solvent. In this form the catalyst complex may either be immediately added to the polymer solution to be hydrogenated or it can be stored for fairly long periods and used as required.

Hydrogenation is carried out with elementary hydrogen which is conveniently introduced into the polymer solution in the form of gas. Hydrogen pressures of from 1 to 200 atm are possible, although we prefer to use pressures ranging from 1 to 50 atm. During hydrogenation the polymer solution should be vigorously stirred to enable the hydrogen to come into contact with the polymer as rapidly as possible. The temperature at which hydrogenation is carried out may be between −40° and +200° C, the preferred temperatures being in the range of 20° to 100° C. Since the catalyst complexes are prone to attack by oxygen, it is convenient to operate in an atmosphere of hydrogen. The hydrogenation reaction proceeds very quickly, and it is usual for a 100 percent hydrogenation to be achieved in a few hours. We have observed that terminal olefinic double bonds, that is, for example, double bonds situated at the ends of chains or on vinyl side groups, are hydrogenated more readily than intermediate double bonds, such as those occurring in the 1,4-position in the polymerization of dienes. Thus selective hydrogenation may be carried out if desired; if hydrogenation is stopped prematurely, partial hydrogenation will occur, lateral vinyl groups reacting preferentially, that is, they are the first groups to react.

If hydrogen is provided in adequate quantities, the hydrogenation proceeds up to a total degree of unsaturation of less than 10 percent, that is, at least 90 percent of the olefinic double bonds present in the polymer are hydrogenated. The degree of unsaturation is measured by usual methods, such as infrared spectroscopy or iodine number determinations.

Under mild reaction conditions aromatic double bonds such as are present in copolymers of dienes and vinyl aromatic compounds are not hydrogenated. However, aromatic double bonds will be hydrogenated when the hydrogen pressure is raised, conveniently up to more than 10 atmospheres, and when the molar ratio of component A to component B is relatively high.

After hydrogenation the catalyst residues are removed from the polymer solution and the hydrogenated polymer is removed from the solution. To this end the catalyst complex is first of all destroyed by the addition of acidified water to the polymer solution. Then the aqueous phase is separated from the organic phase. We have found that the catalyst constituents are more completely transferred to the aqueous phase and that phase separation is improved when the catalyst complex contains hexa-alkylphosphoric acid triamide. This effect is enhanced by adding further quantities of hexa-alkylphosphoric acid triamide to the polymer solution after hydrogenation is complete, as proposed in a special embodiment of the invention. The polymer may then be isolated from the catalyst-free polymer solution by usual methods, for example by evaporating the solvent or precipitating with methanol.

The resulting hydrogenated polymers are useful in the rubber industry or as plasticizers in the manufacture of impact-resistant thermoplastics.

EXAMPLE 1 a. Preparation of catalyst complex 1.7 g of cobaltous acetylacetonate and 7.5 ml of HMPT are dissolved in 14 ml of hexane under nitrogen and to the resulting solution there are added 76 ml of a 20 percent solution of aluminum triisobutyl in hexane. The molar ratio of A : B : C is 1 : 9 : 6. Heat is generated and a deep brown catalyst solution is obtained.

b. Preparation of polymer 700 ml of butadiene are polymerized in 2,500 ml of hexane in the presence of 25 millimoles of n-butyl lithium at 70° C. Polymerization is complete after about 3 hours. There is thus obtained a polybutadiene having a molecular weight of about 175,000 and in which about 10 percent of the monomer units are in the 1,2-position.

c. Hydrogenation

Hydrogenation is carried out in a stirred 5 liter vessel in which the stirring speed is about 150 r.p.m. (anchor agitator).

5 ml of the solution of catalyst complex are added to the polymer solution. The concentration of catalyst component A in solution (b) is 0.1 millimoles per liter. The mixture is then heated to 70° C. and hydrogen is passed in at a pressure of 4.5 atmospheres. 50 percent of the double bonds are hydrogenated in the first 0.2 hour, and the hydrogenation is virtually complete after 1 hour (the measurement of the degree of unsaturation is effected by infrared spectroscopy using small samples taken from the reaction vessel at intervals of 5 minutes).

d. Isolation of hydrogenated polymer

To the polymer solution there are added 50 ml of HMPT followed by 200 ml of water. The mixture is then vigorously stirred for 5 minutes at 50° C., and a further 200 ml of water are added. The mixture is allowed to stand, and the aqueous phase gradually separates from the organic phase. The aqueous phase is decanted from the organic phase and the latter is distilled in vacuo to remove the solvent. The polymeric residue is dried. This comprises a polyethylene having about 10 percent of lateral ethyl groups. It contains less than 2 ppm of cobalt and 2 ppm of aluminum.

EXAMPLE 2 (Comparative Example)

A catalyst complex is prepared as described in Example 1a but without the addition of HMPT. Polybutadiene is prepared as described in Example 1b and hydrogenated as described in Example 1c. Hydrogenation of the first 50 percent of the double bonds takes 5 hours and the hydrogenation of all of the double bonds takes 30 hours.

EXAMPLE 3 (Comparative Example)

Catalyst preparation, polymerization and hydrogenation are carried out as described in Example 1a, 1b and 1c. In working up the product, however, no further HMPT is added. The final product contains 200 ppm of cobalt and 20 ppm of aluminum. It is colored brown and shows poor resistance to aging.

EXAMPLE 4

In two parallel polymerization charges 75 ml portions of styrene are polymerized in 2,000 ml of toluene in the presence of 15 millimoles of n-butyl lithium at 40° C. After 30 minutes 400 ml of butadiene are added, the temperature rising to 50° to 60° C. Polymerization of the butadiene is complete after 3 hours. A further 25 ml of styrene are then added and polymerization is resumed for 30 minutes at 40° C. There is thus obtained a three-block copolymer of styrene/butadiene/styrene.

To one of the polymer solutions there are added 5 ml of the catalyst solutions prepared as described in Example 1a and to the other polymer solution there are added 5 ml of the catalyst solution prepared as described in Example 2. In each case hydrogenation is effected at 25° C. using a hydrogen pressure of 4.5 atmospheres. In the charge containing the catalyst complex of the invention 50 percent of the double bonds are hydrogenated after 0.25 hour and all of the olefinic double bonds are hydrogenated after 1.3 hours; in the comparative test not making use of HMPT additive hydrogenation of the first 50 percent of the double bonds takes 6 hours and that of all of the double bonds 35 hours.

EXAMPLE 5

300 ml of styrene and 460 ml of butadiene are dissolved in 2,500 ml of toluene and polymerized in the presence of 9 millimoles of n-butyl lithium at 40° to 60° C. during 3 hours. There is obtained a two-component block copolymer, the first block consisting of polybutadiene containing about 10 percent of styrene in random distribution, and the second block consisting of pure polystyrene.

To the polymer solution there are added 5 ml of the catalyst solution prepared as described in Example 1a and hydrogenation is effected at 25° C. using a hydrogen pressure of 3.5 atmospheres. Hydrogenation of the first 50 percent of the double bonds takes 0.2 hour and that of 100 percent of the double bonds takes 1 hour.

The steric configuration of the polybutadiene block was determined in the non-hydrogenated state (100 percent unsaturation) and in the semi-hydrogenated state (50 percent unsaturation), the results being as follows:

TABLE 1

| Unsaturation | % 1,2 portions | % 1,4-cis | % 1,4-trans |
|---|---|---|---|
| 100 | 10 | 35 | 55 |
| 50 | 0 | 20 | 30 |

It is evident that the 1,2-vinyl side groups are preferentially hydrogenated.

The polymer solution was worked up as described in Example 1d with the addition of HMPT. The isolated hydrogenated two-component block copolymer was subjected to mechanical properties tests and the results compared with those obtained in tests on a non-hydrogenated two-component control copolymer:

TABLE 2

| Two-component block copolymer | Tensile Strength | Tear Resistance | Elongation |
|---|---|---|---|
| non-hydrogenated | 19 kg/cm$^2$ | 19 kg/cm$^2$ | 8% |
| hydrogenated | 121 kg/cm$^2$ | 400 kg/cm$^2$ | 400 % |

EXAMPLE 6

Solutions of catalyst complexes were prepared as described in ExamPle 1a with the addition of HMPT but using, in place of cobalt acetylacetonate, equimolar amounts of iron and nickel acetylacetonates. Two-component block copolymers of styrene and butadiene were prepared as described in Example 5 and then hydrogenated with 5 ml of the catalyst solutions in each case. Table 3 gives the hydrogenation times in hours:

TABLE 3

| Catalyst | 50% Hydrogenated | 100% Hydrogenated |
|---|---|---|
| Fe AcAc | 2.5 | 14 hours |
| Ni AcAc | 2.0 | 12 hours |
| Co AcAc | 0.2 | 1 hour |

EXAMPLE 7

Solutions of catalyst complexes were prepared as described in Example 1a using different molar ratios of the components A and C. Two-component block copolymers of styrene and butadiene were hydrogenated as described in Example 5. Table 4 gives the hydrogenation times in hours for the various ratios of A to C.

TABLE 4

| Ratio A : C | 100% Hydrogenated |
|---|---|
| 1 : 0 | 25 |
| 1 : 1 | 20 |
| 1 : 5 | 3.5 |
| 1 : 6 | 1.0 |
| 1 : 7 | 3.0 |
| 1 : 10 | 12.5 |
| 1 : 20 | 23 |

EXAMPLE 8

Solutions of catalyst complexes were prepared as described in Example 1a using various ratios of A to B to C. Two-component block copolymers were hydrogenated as described in Example 5. Table 5 gives the hydrogenation times in hours.

TABLE 5

| Ratio A : B : C | 50% Hydrogenated | 100% Hydrogenated |
|---|---|---|
| 1 : 4 : 6 | 1.0 | 4.0 |
| 1 : 9 : 6 | 0.2 | 1.0 |
| 1 : 18 : 6 | 1.1 | 4.2 |
| 1 : 4 : 10 | 0.3 | 1.5 |
| 1 : 9 : 10 | 2.0 | 12.5 |
| 1 : 18 : 10 | 0.2 | 1.1 |

EXAMPLE 9 a. A catalyst complex was prepared from 1.7 g of iron acetylacetonate, 76 ml of a 20 percent solution of aluminum triisobutyl and various quantities of HMPT.

A two-component block copolymer was hydrogenated as described in Example 5 but using a pressure of 4.5 hydrogen atmospheres and a temperature of 40° C. Table 6 gives the hydrogenation times in hours for the various molar ratios:

TABLE 6

| Ratio A : B : C | 50% Hydrogenated | 100% Hydrogenated |
|---|---|---|
| 1 : 9 : 0.8 | 0.8 | 3.5 |
| 1 : 9 : 2 | 0.5 | 1.8 |
| 1 : 9 : 3.7 | 0.4 | 1.6 |
| 1 : 9 : 5 | 0.8 | 4.0 |
| 1 : 9 : 6 | 2.5 | 14 |
| 1 : 9 : 0 | 3.0 | 16 |

It will be seen from the Table that where iron acetylacetonate is used as component A less HMPT is required to achieve optimum hydrogenation times than when cobalt acetylacetonate is used.

EXAMPLE 10

Solutions of catalyst complexes were prepared as described in Example 1a but using, in place of HMPT, equimolar amounts of other polar compounds.

Two-component block copolymers were hydrogenated as described in Example 5. Table 7 gives the hydrogenation times in hours.

TABLE 7

| Additive | 50% Hydrogenated | 100% Hydrogenated |
|---|---|---|
| None | 4.0 | 25 |
| HMPT (invention) | 0.2 | 1.0 |
| dimethyl sulfoxide | 1.9 | 9.5 |
| dimethyl formamide | 2.5 | 10.0 |
| diethyl ether | 2.2 | 8.0 |
| dioxane | 1.0 | 4.0 |
| trimethylamine | 1.2 | 5.8 |
| tributyl phosphite | 2.0 | 8.5 |
| tributyl phosphate | 2.5 | 10 |

EXAMPLE 11

A solution of a catalyst complex was prepared from 1.7 g of cobalt acetylacetonate, 60 ml of hexane, 5 ml of HMPT and 30 ml of a 20 percent solution of aluminum trimethyl in hexane. The molar ratio of the components A to B to C is 1 : 3.8 : 4. A two-component block copolymer of styrene and butadiene was produced as described in Example 5 but using elevated hydrogen pressure (about 100 atmospheres) and elevated temperature (80° C). Hydrogenation was stopped after 6 hours, and the product was then analyzed. No olefinic double bonds and only 10 percent of the aromatic double bonds were found.

EXAMPLE 12

A solution of a catalyst complex was prepared from 0.85 g of ferrous chloride, 42.5 ml of hexane, 42.5 ml of HMPT and 32.5 ml of aluminum triisobutyl. The molar ratio of A to B to C was 1 : 4 : 35.

A two-component block copolymer was hydrogenated using 10 ml of the above solution (equivalent to 0.2 millimoles of iron per liter). Half of the double bonds were hydrogenated after 0.3 hour and all were hydrogenated after 1.4 hours.

What we claim is:

1. A process for the catalytic hydrogenation of polymers containing double bonds by the action of hydrogen on a solution of the polymer in an inert organic solvent and in the presence of a catalyst complex consisting of:
   A. a compound of iron, cobalt or nickel,
   B. an organo-aluminum compound and
   C. an activator, wherein the activator used is a hexa-alkylphosphoric acid triamide of the general formula:

$$OP(NR_2)_3$$

in which R is alkyl of from one to four carbon atoms, the components A and B being used in a molar ratio of from 1 : 40 to 1 : 1 and the components A and C in a molar ratio of from 1 : 0.5 to 1 : 100.

2. A process as claimed in claim 1 wherein a further quantity of hexa-alkylphosphoric acid triamide is added to the polymer solution after completion of hydrogenation, whereupon the catalyst complex is destroyed by the addition of optionally acidified water and the catalyst residues are removed together with the aqueous phase.

* * * * *

PO-1050
(5/69)

UNITED STATES PATENT OFFICE
CERTIFICATE OF CORRECTION

Patent No. 3,673,281      Dated June 27, 1972

Inventor(s) Klaus Bronstert et al

It is certified that error appears in the above-identified patent and that said Letters Patent are hereby corrected as shown below:

First Page, left-hand column, "P 19 13 263.2" should read -- P 20 13 263.2 --.

Column 1, line 64, "remOval" should read -- removal --.

Column 4, line 50, "25" should read -- 75 --.

Column 5, line 37, "ExamPle" should read -- Example --.

Signed and sealed this 19th day of December 1972.

(SEAL)
Attest:

EDWARD M. FLETCHER, JR.           ROBERT GOTTSCHALK
Attesting Officer                 Commissioner of Patents